(12) United States Patent
Ikarashi

(10) Patent No.: US 10,749,427 B2
(45) Date of Patent: Aug. 18, 2020

(54) SWITCHING POWER SUPPLY DEVICE

(71) Applicant: TDK CORPORATION, Tokyo (JP)

(72) Inventor: Tomokazu Ikarashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/029,005

(22) Filed: Jul. 6, 2018

(65) Prior Publication Data
US 2019/0020265 A1 Jan. 17, 2019

(30) Foreign Application Priority Data

Jul. 11, 2017 (JP) .................................. 2017-135150

(51) Int. Cl.
*H02M 1/34* (2007.01)
*H02M 3/337* (2006.01)
(Continued)

(52) U.S. Cl.
CPC .............. *H02M 1/34* (2013.01); *H02M 3/24* (2013.01); *H02M 3/335* (2013.01); *H02M 3/337* (2013.01);
(Continued)

(58) Field of Classification Search
CPC ...... H02M 1/34; H02M 1/081; H02M 5/2573; H02M 5/293; H02M 7/12; H02M 2003/1566; H02M 2003/1557; H02M 3/10; H02M 3/125; H02M 3/13; H02M 3/135; H02M 3/145; H02M 3/15; H02M 3/155; H02M 3/156; H02M 3/158; H02M 3/1588; H02M 3/1582; G05F 1/00; G05F 1/10; G05F 1/12; G05F 1/40; G05F 1/46; G05F 1/455; G05F 1/45; G05F 1/445; G05F 1/52; G05F 1/56; G05F 1/66; G05F 1/575; G05F 3/10; G05F 3/16; G05F 3/18; G05F 3/185; G05F 3/20; G05F 3/26; G05F 3/30;
(Continued)

(56) References Cited

U.S. PATENT DOCUMENTS 4,441,148 A 4/1984 Hirata
4,677,348 A * 6/1987 Schweickardt ...... H05B 41/042
315/276
(Continued)

FOREIGN PATENT DOCUMENTS

CN 104852615 8/2015
JP 57-142171 9/1982
(Continued)

OTHER PUBLICATIONS

Official Communication issued in Chinese Patent Appl. No. 201810533838.5, dated Dec. 18, 2019, along with an English translation thereof.

*Primary Examiner* — Thienvu V Tran
*Assistant Examiner* — Nusrat Quddus
(74) *Attorney, Agent, or Firm* — Greenblum & Bernstein, P.L.C.

(57) ABSTRACT

An electronic device includes a power converter and a current detector that is disposed at at least one position out of a primary-side position and a secondary-side position for the power converter and detects a current flowing at the at least one position. A snubber circuit including a capacitor is directly connected in parallel to both ends of the current detector.

4 Claims, 2 Drawing Sheets

(51) Int. Cl.
*H02M 3/335* (2006.01)
*H02M 3/24* (2006.01)
*H02M 1/00* (2006.01)

(52) U.S. Cl.
CPC ........... *H02M 2001/0009* (2013.01); *H02M 2001/346* (2013.01); *H02M 2001/348* (2013.01)

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; H04B 2215/069; B23K 11/24
USPC ............................................ 363/15, 125–127
See application file for complete search history.

(56) References Cited

U.S. PATENT DOCUMENTS

| | | | | |
|---|---|---|---|---|
| 5,055,991 | A * | 10/1991 | Carroll | H02M 1/34 361/111 |
| 5,479,090 | A * | 12/1995 | Schultz | G05F 1/56 323/284 |
| 5,936,387 | A * | 8/1999 | Tabata | H02M 7/538 323/225 |
| 6,343,021 | B1 * | 1/2002 | Williamson | H02M 1/10 363/163 |
| 7,551,462 | B2 * | 6/2009 | Uruno | H02M 3/158 363/21.02 |
| 7,679,939 | B2 * | 3/2010 | Gong | H02M 3/33507 363/21.15 |
| 8,350,518 | B2 * | 1/2013 | Ueda | H02M 5/297 318/800 |
| 8,964,414 | B2 * | 2/2015 | Kojima | H02M 3/33576 363/17 |
| 2003/0137797 | A1 * | 7/2003 | Kimoto | C04B 35/462 361/321.2 |
| 2004/0257833 | A1 * | 12/2004 | Yang | H02M 3/33507 363/16 |
| 2005/0024898 | A1 * | 2/2005 | Yang | H02M 3/33507 363/21.12 |
| 2006/0193152 | A1 * | 8/2006 | Ushijima | H02M 7/53838 363/13 |
| 2012/0153869 | A1 * | 6/2012 | Sadwick | H05B 33/0815 315/307 |
| 2016/0141915 | A1 * | 5/2016 | Descarries | H02J 7/04 315/86 |
| 2018/0040424 | A1 * | 2/2018 | Takahashi | C04B 35/495 |

FOREIGN PATENT DOCUMENTS

| | | |
|---|---|---|
| JP | 6-245501 | 9/1994 |
| JP | 6-276725 | 9/1994 |
| JP | 2010-017080 | 1/2010 |
| JP | 2012-005265 | 1/2012 |

* cited by examiner

SWITCHING POWER SUPPLY DEVICE

FIELD OF THE INVENTION

The present invention relates to an electronic device equipped with a power converter and a current detector that is disposed at at least one position out of a primary-side position and a secondary-side position of the power converter and detects a current flowing at the disposed position(s).

DESCRIPTION OF THE RELATED ART

As one example of this type of electronic device, a motor driving apparatus disclosed in Patent Literature 1 (see Japanese Laid-open Patent Publication No. 2010-17080 (Pages 4, 5 and FIGS. 1 to 4) is known. This motor driving apparatus includes a rectifier circuit that inputs an alternating current (hereinafter "AC") power supply, a first capacitor (or "smoothing capacitor") that is connected across the output terminals of the rectifier circuit, and a three-phase inverter as a power converter that is connected in parallel to the first capacitor, and is configured so as to be capable of supplying the output of the three-phase inverter to a motor. This motor driving apparatus is additionally equipped with a second capacitor that is connected in parallel to an input side of the three-phase inverter, a current detector that is connected between the first capacitor and the second capacitor, and a snubber circuit (a series circuit produced by connecting a resistor and a third capacitor) connected in parallel to the first capacitor closer to the power supply (i.e., closer to the rectifier circuit) than the current detector.

Since this motor driving apparatus is provided with a snubber circuit as described above, unlike a configuration that is not provided with a snubber circuit, it is possible to significantly shorten transient states that occur in the current flowing (on a direct current (hereinafter "DC") link) between the output of the rectifier circuit and the input of the three-phase inverter during switching of the three-phase inverter, which means that it is possible to greatly shorten the period during which the current flowing on the DC link cannot be measured (i.e., to shorten the waiting time until convergence of a transient state).

SUMMARY OF THE INVENTION

With the motor driving device described above as an electronic device, when increasing the capacitance of the capacitor (or "third capacitor") that constructs the snubber circuit to enhance the functioning of the snubber circuit, it is necessary to either replace the third capacitor with a capacitor that has the same withstand voltage as the existing third capacitor (that is, a withstand voltage that exceeds the DC voltage supplied from the rectifier circuit to the DC link) but has a larger capacitance than the third capacitor, or to connect a capacitor with the same withstand voltage as the third capacitor in parallel to the third capacitor.

However, for typical capacitors, when the withstand voltage is the same, there is a tendency for the external dimensions to increase as the capacitance increases. This means that for the motor driving apparatus described above, there is the problem of an unavoidable increase in the mounting area of the capacitor(s) disposed on the DC link with both of the methods described above (i.e., when the existing capacitor is replaced with a different capacitor with a larger capacitance, and when another capacitor is connected in parallel to the existing capacitor). As other tendencies of typical capacitors, when the external dimensions are the same, it is possible to increase the capacitance as the withstand voltage falls, and when the capacitance is the same, it is possible to reduce the external dimensions as the withstand voltage falls. This means that for the motor driving apparatus described above, since it is difficult to use a low withstand-voltage capacitor (with a withstand voltage that is lower than the DC voltage supplied from the rectifier circuit) which would make it possible to increase capacitance while maintaining the same external dimensions, the only remaining option is to increase the capacitance of the capacitor in the snubber circuit described above to which a DC voltage is directly applied from the rectifier circuit. As a result, there is the problem that it is difficult to efficiently increase the capacitance of the capacitor of the snubber circuit while extensively suppressing any increase in mounting area.

The present invention was conceived in view of the problem described above and has a principal object of providing an electronic device where it is possible to efficiently increase the capacitance of the capacitor (s) in a snubber circuit while extensively suppressing increases in the mounting area of the capacitor(s) in the snubber circuit.

To achieve the stated object, an electronic device according to the present invention comprises: a power converter; and a current detector that is disposed at at least one position out of a primary-side position and a secondary-side position for the power converter and detects a current flowing at the at least one position, wherein a snubber circuit including a capacitor is directly connected in parallel to both ends of the current detector.

According to the above electronic device, since the snubber circuit which includes a capacitor is directly connected in parallel to both ends of the current detector where the produced voltage drop between both ends is extremely low, it is possible for the snubber circuit to sufficiently suppress transient states which may occur in the current flowing at the at least one position described above due to the inductance component present between the two ends of the current detector. By using this configuration, since it is possible to use a low withstand-voltage capacitor as the capacitor in the snubber circuit and capacitors typically have a tendency where it is possible to reduce the external dimensions in keeping with a fall in the withstand voltage for the same capacitance, it is possible here to maintain the required capacitance but still greatly reduce the external dimensions of the capacitor(s) in the snubber circuit(s), which means that it is possible to greatly reduce the mounting area of the capacitors. Capacitors typically have another tendency where when the external dimensions are the same, it is possible to increase the capacitance as the withstand voltage falls, which means that it is possible to efficiently increase the capacitances of the capacitors while greatly suppressing an increase in the mounting area of the capacitors in the snubber circuits.

Also, in the electronic device according to the present invention, the snubber circuit is constructed of a series circuit with the capacitor and a resistor. According to the above electronic device, since it is possible to cause rapid attenuation in the amplitude in a transient state which may occur in the current flowing at the at least one position described above, it is possible to greatly reduce the time spent in the transient state.

Further, in the electronic device according to the present invention, the capacitor is a high dielectric constant multilayer ceramic capacitor. According to the above electronic device, even when a high dielectric constant multilayer ceramic capacitor that has a DC bias characteristic such that the electrostatic capacitance gradually decreases as the applied DC voltage increases is used in the snubber circuit, it is possible to use the capacitor in a region where the applied DC voltage is low, that is, in a region where the electrostatic capacitance is high.

Also, in the electronic device according to the present invention, the current detector is disposed between a smoothing capacitor, which is disposed at the at least one position, and the power converter, and the snubber circuit is directly connected in parallel to the current detector. According to the above electronic device, since the current detector and the snubber circuit are directly connected in parallel at an appropriate position on at least one of the primary side and the secondary side of the electronic device, it is possible to sufficiently suppress transient states that may occur in the current flowing due to the inductance component present between both ends of the current detector more effectively.

It should be noted that the disclosure of the present invention relates to a content of Japanese Patent Application 2017-135150 that was filed on 11 Jul. 2017 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an electronic device will now be described with reference to the attached drawings.

Figure 1:
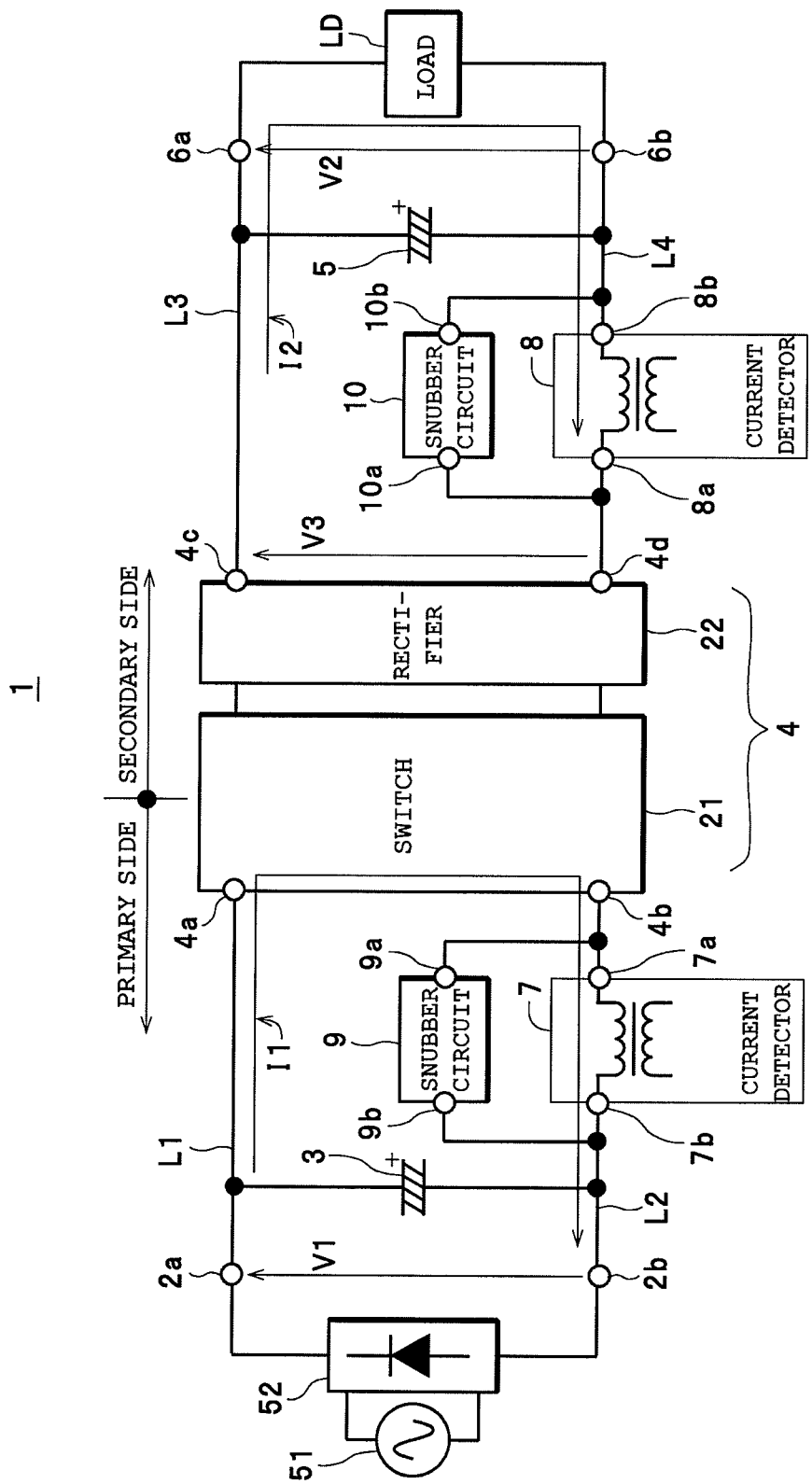
FIG. 1 is a block diagram depicting the configuration of an electronic device 1.

First, the configuration of an electronic device 1 as one example of an "electronic device" for the present invention will be described with reference to FIG. 1. As one example, the electronic device 1 is a switching power supply device and includes a pair of input terminals 2a and 2b, an input smoothing capacitor 3, a power converter 4, an output smoothing capacitor 5, a pair of output terminals 6a and 6b, a first current detector 7, a second current detector 8, a first snubber circuit 9, and a second snubber circuit 10, and is configured so as to be capable of converting a voltage V1 across both ends of the input smoothing capacitor 3 to an output voltage V2 at the power converter 4 and outputting the output voltage V2 from the pair of output terminals 6a and 6b to a load LD.

As one example, a rectifier circuit 52 that rectifies (full-wave rectification or half-wave rectification) and outputs the AC voltage outputted from an AC power supply 51 is connected to the pair of the input terminals 2a and 2b. The input smoothing capacitor 3 (hereinafter also referred to simply as the "smoothing capacitor 3") is a smoothing capacitor disposed at a "primary-side position", described later, for the power converter 4. As one example, the smoothing capacitor 3 is constructed of an electrolytic capacitor, for which capacitors with a large capacitance value and a high withstand voltage are easy to obtain, and is connected between the input terminals 2a and 2b. With this configuration, the smoothing capacitor 3 smoothes the DC voltage (pulse voltage) outputted from the rectifier circuit 52. By doing so, the voltage V1 across both ends of the smoothing capacitor 3 is outputted via a pair of input power lines L1 and L2 (hereinafter also referred to simply as the "power lines L1 and L2") to the power converter 4 as a DC voltage on which a ripple component is superimposed.

As one example, the power converter 4 includes a switch 21 and a rectifier 22 and converts the voltage V1 across both ends inputted across both input terminals 4a and 4b via the input power lines L1 and L2 to the DC voltage V3 which is outputted across output terminals 4c and 4d. As one example in the present embodiment, the input terminal 2a and the input terminal 4a are connected by one power line L1 and the input terminal 2b and the input terminal 4b are connected by another power line L2 (the power line L2 on which a parallel circuit composed of the first current detector 7 and the first snubber circuit 9 is disposed). The switch 21 includes one or two or more switching elements, not illustrated, that perform an on/off operation based on a driving signal supplied from a control circuit, not illustrated, and is configured as an inverter that outputs an AC pulse voltage by switching the voltage V1 inputted across the input terminals 4a and 4b. The rectifier 22 includes rectifier elements, such as one or two or more diodes, not illustrated, and rectifies the AC pulse voltage outputted from the switch 21 to generate the DC voltage V3 which is outputted across the output terminals 4c and 4d. The DC voltage V3 is supplied via a pair of output power lines L3 and L4 (hereinafter also referred to simply as the "power lines L3 and L4") to the pair of output terminals 6a and 6b. As one example in the present embodiment, the output terminal 4c and the output terminal 6a are connected by one power line L3 and the output terminal 4d and the output terminal 6b are connected by another power line L4 (the power line L4 on which a parallel circuit composed of the second current detector 8 and the second snubber circuit 10 is disposed).

The output smoothing capacitor 5 (hereinafter also referred to simply as the "smoothing capacitor 5") is a smoothing capacitor disposed at a "secondary-side position", described later, for the power converter 4. As one example, the smoothing capacitor 5 is an electrolytic capacitor, for which capacitors with a large capacitance value and a high withstand voltage are easy to obtain, and is connected between the output terminals 6a and 6b. With this configuration, the smoothing capacitor 5 smoothes the DC voltage (pulse voltage) outputted from the rectifier 22 of the power converter 4. By doing so, the output voltage V2 is outputted across the output terminals 6a and 6b as a DC voltage on which a ripple component is superimposed.

The first current detector 7 (hereinafter also referred to simply as the "current detector 7") is disposed on one of the power lines L1 and L2 (that is, at a position on the primary side (hereinafter "primary-side position") for the power converter 4). Although the current detector 7 is disposed on the power line L2 positioned on a reference potential side of the voltage V1 as one example in the present embodiment, the current detector 7 may be disposed on the power line L1. The current detector 7 detects the current (or "input current") I1 inputted into the power converter 4, generates a detection signal, not illustrated, whose voltage value changes in proportion to a current value of the current I1, and outputs to the control circuit, not illustrated, mentioned above.

The second current detector 8 (hereinafter also referred to simply as the "current detector 8") is disposed on one of the power lines L3 and L4 (that is, at a position on the secondary side (hereinafter "secondary-side position") of the power converter 4). Although the current detector 8 is disposed on the power line L4 positioned on a reference potential side of the output voltage V2 as one example in the present embodiment, the current detector 8 may be disposed on the power line L3. The current detector 8 detects the current (or "output current") I2 outputted from the power converter 4, generates a detection signal, not illustrated, whose voltage value changes in proportion to a current value of the current I2, and outputs to the control circuit, not illustrated, mentioned above. Although in the present embodiment, the current detectors 7 and 8 are constructed of current transformers where the voltage drops that occur at the respective primary windings disposed on the power lines L2 and L4 are extremely low, the present invention is not limited to this. As one example, instead of current transformers, the current detectors 7 and 8 can be constructed of resistors (so-called "shunt resistors") with low resistance values such that the voltage drops that occur when the current I1 and the current I2 flow are negligible compared to the voltage V1 and the output voltage V2.

Note that the control circuit controls the voltage value of the output voltage V2 and the current value of the current I2 by controlling the pulse width and the like of a driving signal supplied to the switching element described above of the power converter 4 based on detection signals outputted from the current detectors 7 and 8, a detection signal indicating the voltage value of the voltage V1 detected via a voltage detector, not illustrated, and a detection signal indicating the voltage value of the output voltage V2 detected via a voltage detector, not illustrated.

The first snubber circuit 9 (hereinafter also referred to simply as the "snubber circuit 9") is connected in parallel to both ends of the current detector 7 (i.e., to ends 7a and 7b connected to the power line L2). More specifically, the snubber circuit 9 is connected in parallel to the current detector 7 by directly connecting one end 9a of the snubber circuit 9 to one end 7a of the current detector 7 and directly connecting another end 9b of the snubber circuit 9 to another end 7b of the current detector 7.

The second snubber circuit 10 (hereinafter also referred to simply as the "snubber circuit 10") is connected in parallel to both ends of the current detector 8 (i.e., to ends 8a and 8b connected to the power line L4). More specifically, the snubber circuit 10 is connected in parallel to the current detector 8 by directly connecting one end 10a of the snubber circuit 10 to one end 8a of the current detector 8 and directly connecting another end 10b of the snubber circuit 10 to another end 8b of the current detector 8.

Figure 2:
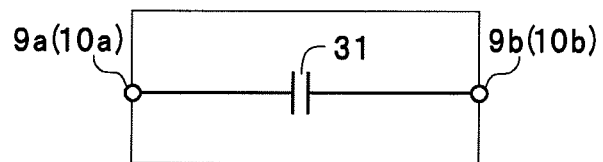
FIG. 2 is a circuit diagram of one example of a snubber circuit 9 (10)
Figure 3:
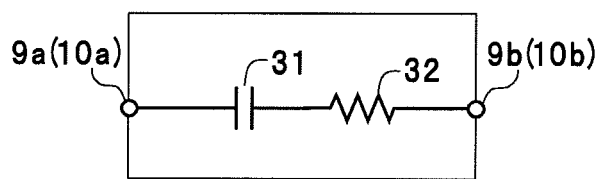
FIG. 3 is a circuit diagram of another example of a snubber circuit 9 (10).

More specifically, the snubber circuits 9 and 10 are each constructed as one snubber circuit out of a C snubber circuit constructed of only a capacitor 31 as depicted in FIG. 2 and a RC snubber circuit constructed of a series circuit with a capacitor 31 and a resistor 32 as depicted in FIG. 3. That is, the snubber circuits 9 and 10 are both snubber circuits including a capacitor. Here, both of the snubber circuits 9 and 10 may be constructed of the snubber circuit depicted in FIG. 2 (i.e, a C snubber circuit), both may be constructed of the snubber circuit depicted in FIG. 3 (i.e., an RC snubber circuit), and the snubber circuits 9 and 10 may be constructed of respectively different snubber circuits (i.e., one C snubber circuit and one RC snubber circuit).

It has been confirmed that when the snubber circuits 9 and 10 are constructed of either of the C snubber circuit and the RC snubber circuit described above, and are disposed in the same configuration as the electronic device (motor driving apparatus) described in the background art (that is, when the snubber circuit 9 is connected in parallel to the smoothing capacitor 3 and the snubber circuit 10 is connected in parallel to the smoothing capacitor 5), a same level of functioning or higher is achieved. The reason for this is that although the transient state, which is caused by the switching of the voltage V1 by the switch 21 of the power converter 4, in the current I1 that flows at the primary-side position (i.e., the DC link where the smoothing capacitor 3 is disposed) for the power converter 4 occurs due to various factors, the main factor is the inductance component present between both ends 7a and 7b of the current detector 7 (this inductance component is present even when the current detector is constructed of a resistor). In the same way, although a transient state occurs due to various factors in the current I2 that flows at a secondary-side position for the power converter 4 (the DC link where the smoothing capacitor 5 is provided), the main factor is the inductance component present between both ends 8a and 8b of the current detector 8. For this reason, the snubber circuits 9 and 10 are directly connected in parallel to the current detectors 7 and 8 that are the main factor for the transient states that occur in the currents, thereby making current loops very short (that is, current loops where the equivalent series impedance is extremely small), which makes it possible to sufficiently suppress the occurrence of transient states.

Also, as described above, the snubber circuit 9 is connected in parallel between both ends 7a and 7b of the current detector 7 where the produced voltage drop is extremely low and the snubber circuit 10 is connected in parallel between both ends 8a and 8b of the current detector 8 where the produced voltage drop is extremely low. This means that when the snubber circuits 9 and 10 are constructed of either of the C snubber circuit and the RC snubber circuit described above, it is possible to use capacitors with an extremely low withstand voltage compared to the voltage V1 and the output voltage V2 as the included capacitors 31. Accordingly, by comparing with an imaginary configuration where the snubber circuit 9 is connected in parallel to the smoothing capacitor 3 as in the electronic device described in the background art, the ability to use a capacitor 31 with a lower withstand voltage in the electronic device 1 makes it possible to greatly miniaturize the external dimensions when the capacitance of the capacitor 31 is set the same as before. In the same way, the snubber circuit 10 can also be constructed using a capacitor 31 with greatly reduced external dimensions. Compared to the electronic device described in the background art, circuit board layout for disposing the snubber circuits 9 and 10 also becomes easier.

In this way, according to the electronic device 1, by directly connecting the snubber circuit 9, which includes the capacitor 31, in parallel to the two ends 7a and 7b of the current detector 7 that is disposed on one of the power lines L1 and L2 (in the present embodiment, the power line L2) as a primary-side position for the power converter 4 and has an extremely low voltage drop between the two ends 7a and 7b and directly connecting the snubber circuit 10, which includes the capacitor 31, in parallel to the two ends 8a and 8b of the current detector 8 that is disposed on one of the power lines L3 and L4 (in the present embodiment, the power line L4) as a secondary-side position for the power converter 4 and has an extremely low voltage drop between the two ends 8a and 8b, it is possible for the snubber circuit 9 to sufficiently suppress transient states which may occur in the current I1 due to the inductance component present between the two ends 7a and 7b of the current detector 7 and for the snubber circuit 10 to sufficiently suppress transient states which may occur in the current I2 due to the inductance component present between the two ends 8a and 8b of the current detector 8.

Also, according to the electronic device 1, since it is possible to use low withstand-voltage capacitors as the capacitors 31 in the snubber circuits 9 and 10, when the snubber circuit disposed at a primary-side position for the power converter 4 is constructed of only the snubber circuit 9 and the snubber circuit disposed at a secondary-side position of the power converter 4 is constructed of only the snubber circuit 10 as in the electronic device 1, it is possible to construct all of the capacitors 31 in the snubber circuits 9 and 10 included in the electronic device 1 of low withstand-voltage capacitors. Since capacitors typically have a tendency where it is possible to reduce the external dimensions in keeping with a fall in the withstand voltage for the same capacitance, it is possible here to maintain the required capacitance but still greatly reduce the external dimensions of the capacitors 31, which means that it is possible to greatly reduce the mounting area of the capacitors 31. Capacitors typically have another tendency where when the external dimensions are the same, it is possible to increase the capacitance as the withstand voltage falls, which means that it is possible to efficiently increase the capacitances of the capacitors 31 while greatly suppressing an increase in the mounting area of the capacitors 31 in the snubber circuits 9 and 10.

Also, according to the electronic device 1, by using the configuration depicted in FIG. 3 (that is, the RC snubber circuit that is composed of a series circuit with the capacitor 31 and the resistor 32) in the snubber circuits 9 and 10, although the mounting area increases by an amount corresponding to the resistor 32 compared to the configuration depicted in FIG. 2 that can achieve the greatest reduction in the overall mounting area of the snubber circuits 9 and 10, it is possible, when a transient state with a low amplitude occurs in the current I1 and the current I2, to cause rapid attenuation in this amplitude, which means that the time spent in the transient state can be greatly reduced.

Note that although in the electronic device 1 described above, a configuration is used where the snubber circuits disposed at the primary-side position and the secondary-side position for the power converter 4 are composed of the snubber circuit 9 which is directly connected in parallel to the current detector 7 and the snubber circuit 10 which is directly connected in parallel to the current detector 8, the snubber circuits disposed at a primary-side position and a secondary-side position for the power converter 4 are not limited to this configuration. As one example, although not illustrated, it is possible for the electronic device 1 to use a configuration which is equipped with a snubber circuit connected in parallel to the smoothing capacitor 3 as in the electronic device (motor driving apparatus) described in the background art but additionally includes the snubber circuit 9 connected in parallel between both ends 7a and 7b of the current detector 7 to increase the overall capacitance of capacitors in snubber circuits at primary-side positions. Similarly, although not illustrated, it is possible for the electronic device 1 to use this primary-side configuration of snubber circuits on the secondary-side. That is, it is also possible to use a configuration which is equipped with a snubber circuit connected in parallel to the smoothing capacitor 5 but additionally includes the snubber circuit 10 connected in parallel between both ends 8a and 8b of the current detector 8 to increase the overall capacitance of capacitors in snubber circuits at secondary-side positions.

With the electronic device 1 of this configuration, by increasing the overall capacitance of the capacitors in the snubber circuits, it is possible, while further suppressing transient states that may occur in the current I1 and the current I2 flowing on the primary side positions and/or the secondary side positions of the power converter 4 with the overall snubber circuits, to extensively suppress the increase in the overall mounting area of the capacitors in the snubber circuits (i.e., increases in mounting area due to the capacitors 31 of the snubber circuits 9 and 10) through the use low withstand-voltage capacitors (i.e., capacitors that have small external dimensions even for the same capacitance). That is, it is possible to efficiently increase the overall capacitance of the capacitors in the snubber circuits while extensively suppressing any increase in the overall mounting area of the capacitors in the snubber circuits.

With the electronic device 1 described above, since the current detector 7 is disposed at a primary-side position for the power converter 4, the current detector 8 is disposed at a secondary-side position for the power converter 4, the snubber circuit 9 is connected in parallel to the current detector 7 and the snubber circuit 10 is connected in parallel to the second current detector 8, depending on the method by which the control circuit controls the switch 21, it is also possible to use a configuration where the current detector 7 is disposed at a primary-side position for the power converter 4 but a current detector is not disposed at a secondary-side position or conversely a configuration where the current detector 8 is disposed at a secondary-side position for the power converter 4 but a current detector is not disposed at a primary-side position. For an electronic device 1 of this configuration, it is possible to use a configuration where a snubber circuit is disposed at the one position where the current detector is disposed out of the primary-side position and the secondary-side position for the power converter 4.

Also, when a high dielectric constant multilayer ceramic capacitor (that is, a capacitor with a DC bias characteristic such that the electrostatic capacitance gradually decreases as the applied DC voltage increases) is used as the capacitor 31 of the snubber circuit 9 and/or the snubber circuit 10, since such capacitor will be used in a region where the applied DC voltage is low (that is, a region where the electrostatic capacitance is high), the configuration of the electronic device 1 described above (i.e., the configuration where snubber circuits are connected in parallel to the current detectors) is preferable.

What is claimed is:

1. A switching power supply device comprising:
   a power converter;
   a smoothing capacitor disposed in a state where the smoothing capacitor is connected to the power converter via power lines at at least one position out of a primary-side position and a secondary-side position for the power converter; and
   a current detector that is disposed on the power lines and detects a current flowing on the power lines,
   wherein the current detector has a first end out of both ends thereof connected to the power converter via a power converter-side position on the power lines, and a second end out of both the ends connected to the smoothing capacitor via a smoothing capacitor-side position on the power lines, and
   wherein a snubber circuit including a capacitor is directly connected in parallel to both the ends of the current detector.

2. The switching power supply device according to claim 1,
   wherein the snubber circuit is constructed of a series circuit with the capacitor and a resistor.

3. The switching power supply device according to claim 1,
   wherein the capacitor is a high dielectric constant multi-layer ceramic capacitor.

4. The switching power supply device according to claim 2,
   wherein the capacitor is a high dielectric constant multi-layer ceramic capacitor.

\* \* \* \* \*